United States Patent
Villa et al.

(10) Patent No.: US 10,827,307 B2
(45) Date of Patent: Nov. 3, 2020

(54) VARIABLE PING RATE FOR A LOCATION TRACKER

(71) Applicant: QUALCOMM Incorporated, San Diego, CA (US)

(72) Inventors: Andrea Villa, San Diego, CA (US); Suzana Arellano, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/152,909

(22) Filed: Oct. 5, 2018

(65) Prior Publication Data

US 2020/0112834 A1  Apr. 9, 2020

(51) Int. Cl.
*H04W 4/029* (2018.01)
*H04W 68/00* (2009.01)

(52) U.S. Cl.
CPC .......... *H04W 4/029* (2018.02); *H04W 68/00* (2013.01)

(58) Field of Classification Search
CPC .................................................. H04W 4/029
See application file for complete search history.

(56) References Cited

U.S. PATENT DOCUMENTS

| | | | |
|---|---|---|---|
| 10,187,745 B1* | 1/2019 | Zhao | H04W 4/021 |
| 2005/0066912 A1* | 3/2005 | Korbitz | A01K 15/023 |
| | | | 119/721 |
| 2009/0143079 A1* | 6/2009 | Klassen | G01C 21/20 |
| | | | 455/456.3 |
| 2014/0095091 A1* | 4/2014 | Moore | H04Q 9/00 |
| | | | 702/63 |
| 2014/0159905 A1* | 6/2014 | Thompson | H04W 4/021 |
| | | | 340/573.4 |
| 2014/0162693 A1* | 6/2014 | Wachter | H04W 4/021 |
| | | | 455/456.3 |
| 2014/0274225 A1* | 9/2014 | Lacatus | H04W 24/08 |
| | | | 455/574 |
| 2016/0366546 A1* | 12/2016 | Yamasaki | G06F 3/04842 |
| 2018/0192243 A1* | 7/2018 | Cornwall | H04W 4/022 |

* cited by examiner

*Primary Examiner* — Mohamed Barakat
(74) *Attorney, Agent, or Firm* — MG-IP Law, P.C.

(57) ABSTRACT

Disclosed are techniques for calculating a predicted location of a location tracking device. In an aspect, a wireless communications device detects a breach of a geofence made by the location tracking device, receives data representing a state of the location tracking device, the state of the location tracking device comprising at least a current location of the location tracking device and a velocity of the location tracking device, and determines, based on the data representing the state of the location tracking device, the predicted location of the location tracking device.

30 Claims, 7 Drawing Sheets

VARIABLE PING RATE FOR A LOCATION TRACKER

INTRODUCTION

Aspects of this disclosure relate generally to setting a variable ping rate for a location tracker and the like.

A location tracker is a navigation device, normally attached to moveable property (such as shipping containers, vehicles, and other high-value items, and referred to as an "asset tracker") or animals (such as pets or livestock), or carried/worn by a person (such as a child), that uses some form of positioning technology (e.g., Global Positioning System (GPS)) to track the device's movements and determine its location. The recorded location data can be stored within the location tracker and/or transmitted to an Internet-connected device (referred to as a "receiver") using the cellular, radio, or satellite modem embedded in the location tracker. This allows the receiver to display the location tracker's location on a map either in real time or when analyzing the track later.

A location tracker generally tracks its geographic location and pushes (i.e., "sends") its position, and sometimes other information such as velocity or altitude, at default intervals (referred to as the "ping rate"), to a determined server that can forward the data to a receiver. Alternatively, the location tracker can send its position directly to the receiver, such as over a peer-to-peer connection. Some location trackers permit the user to set the ping rate during device setup, while others do not and have a default ping rate. In either case, the ping rate is fixed and cannot be changed once set. However, a fixed ping rate can negatively impact battery life performance of the location tracker.

Additionally, a user may define a geofence within which a location tracker is free to move, but the breach of which should trigger an alert. The location tracker may store the geofence and periodically (e.g., at the ping rate or more frequently) compare its location to the stored geofence. In the event of a geofence breach, where the user wishes to recover the item to which the location tracker is attached, current location tracking solutions direct the user (generally via an application installed on the receiver) to the last pinged location of the location tracker. However, when the location tracker is still moving, this results in the user going to previous locations of the location tracker, rather than being able to intercept the person/property as it moves to the next location.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for calculating a predicted location of a location tracking device includes detecting, by a wireless communications device, a breach of a geofence made by the location tracking device, receiving, at the wireless communications device, data representing a state of the location tracking device, the state of the location tracking device comprising at least a current location of the location tracking device and a velocity of the location tracking device, and determining, by the wireless communications device, based on the data representing the state of the location tracking device, the predicted location of the location tracking device.

In an aspect, an apparatus for calculating a predicted location of a location tracking device includes at least one processor configured to: detect a breach of a geofence made by the location tracking device, receive data representing a state of the location tracking device, the state of the location tracking device comprising at least a current location of the location tracking device and a velocity of the location tracking device, and determine, based on the data representing the state of the location tracking device, the predicted location of the location tracking device.

In an aspect, an apparatus for calculating a predicted location of a location tracking device includes means for processing configured to: detect a breach of a geofence made by the location tracking device, receive data representing a state of the location tracking device, the state of the location tracking device comprising at least a current location of the location tracking device and a velocity of the location tracking device, and determine, based on the data representing the state of the location tracking device, the predicted location of the location tracking device.

In an aspect, a non-transitory computer-readable medium storing computer-executable instructions for calculating a predicted location of a location tracking device includes the computer-executable instructions comprising at least one instruction instructing a wireless communications device to detect a breach of a geofence made by the location tracking device, at least one instruction instructing the wireless communications device to receive data representing a state of the location tracking device, the state of the location tracking device comprising at least a current location of the location tracking device and a velocity of the location tracking device, and at least one instruction instructing the wireless communications device to determine, based on the data representing the state of the location tracking device, the predicted location of the location tracking device.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
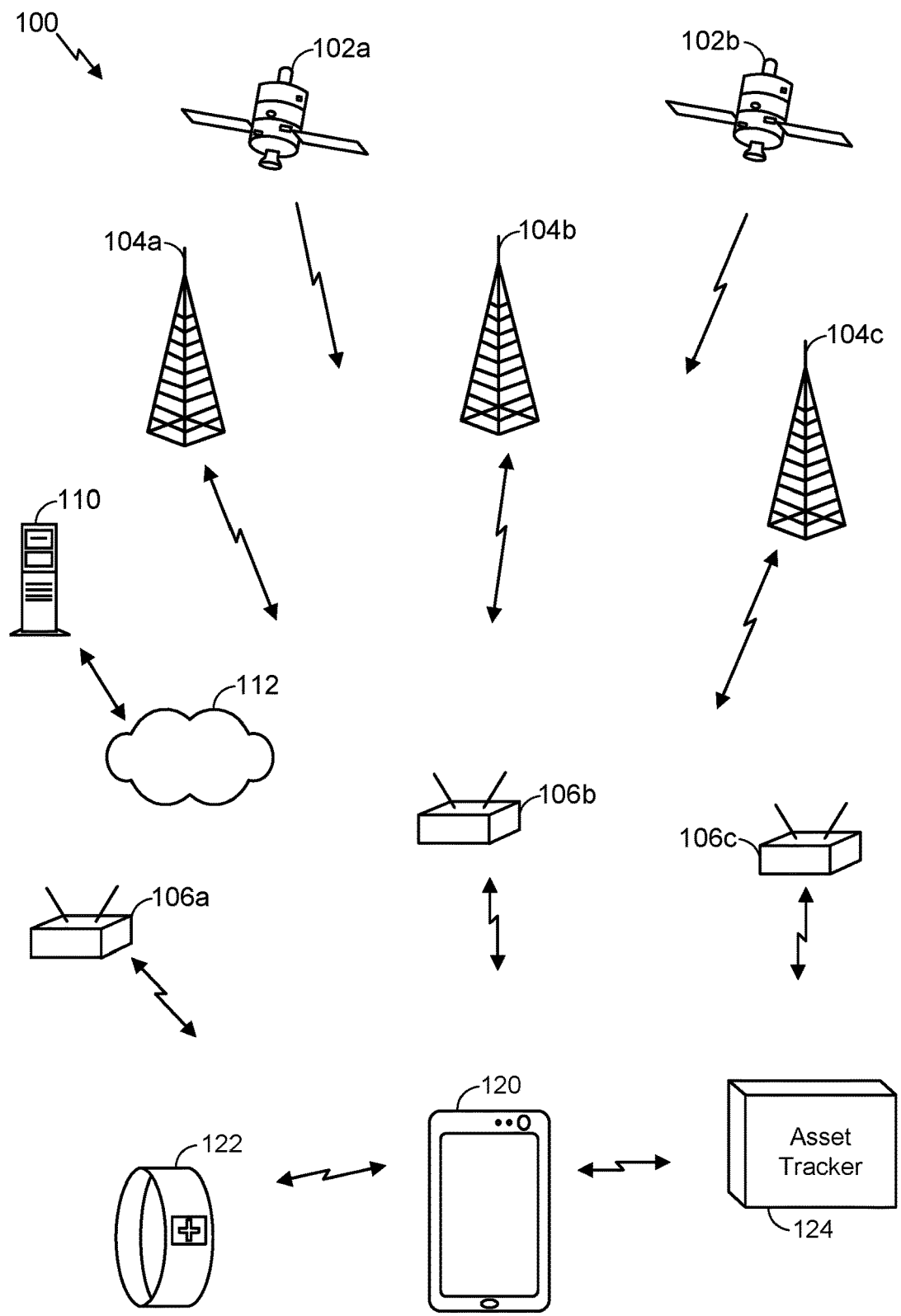
FIG. 1 illustrates an exemplary operating environment for a mobile device that can determine position using wireless techniques, according to one aspect of the disclosure.

FIG. 1 illustrates an exemplary operating environment 100 for various mobile devices having wireless positioning capability. FIG. 1 illustrates an exemplary user device 120 and two exemplary location trackers, a wearable location tracker 122 and an asset tracker 124, that may determine their positions using various wireless positioning systems, as described below. Note that although FIG. 1 illustrates the user device 120 as a "smartphone," as will be appreciated, the user device 120 may be any type of user device, such as a tablet computer, a laptop computer, a desktop computer, a Personal Digital Assistant (PDA), etc.

The operating environment 100 may contain one or more different types of wireless communications systems and/or wireless positioning systems. In the example of FIG. 1, one or more Satellite Positioning System (SPS) satellites 102a, 102b may be used as an independent source of position information for the user device 120 and location trackers 122, 124. The user device 120 and location trackers 122, 124 may include one or more dedicated SPS receivers specifically designed to receive signals for deriving geo-location information from the SPS satellites 102a, 102b.

The operating environment 100 may also include one or more Wide Area Network Wireless Access Points (WAN-WAPs) 104a, 104b, 104c, which may be used for wireless voice and/or data communication, and as another source of independent position information for the user device 120 and location trackers 122, 124. The WAN-WAPs 104a-104c may be part of a wide area wireless network (WWAN), which may include cellular base stations at known locations, and/or other wide area wireless systems, such as, for example, Worldwide Interoperability for Microwave Access (WiMAX) (e.g., IEEE 802.16). The WWAN may include other known network components which are not shown in FIG. 1 for simplicity. Typically, each of the WAN-WAPs 104a-104c within the WWAN may operate from fixed positions, and provide network coverage over large metropolitan and/or regional areas.

The operating environment 100 may further include one or more Local Area Network Wireless Access Points (LAN-WAPs) 106a, 106b, 106c, which may be used for wireless voice and/or data communication, as well as another independent source of position data. The LAN-WAPs 106a-106c can be part of a Wireless Local Area Network (WLAN), which may operate in buildings and perform communications over smaller geographic regions than a WWAN. Such LAN-WAPs 106a-106c may be part of, for example, Wi-Fi networks (802.11x), cellular piconets and/or femtocells, Bluetooth® networks, etc.

The user device 120 and location trackers 122, 124 may derive position information from any one or more of the SPS satellites 102a, 102b, the WAN-WAPs 104a-104c, and/or the LAN-WAPs 106a-106c. Each of the aforementioned systems can provide an independent estimate of the position for the user device 120 and location trackers 122, 124 using different techniques. In some aspects, the user device 120 and location trackers 122, 124 may combine the solutions derived from each of the different types of access points to improve the accuracy of the position data. When deriving position using the SPS satellites 102a, 102b, the user device 120 and location trackers 122, 124 may utilize a receiver specifically designed for use with the SPS that extracts position, using conventional techniques, from a plurality of signals transmitted by SPS satellites 102a, 102b.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment, and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass, or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or Code Division Multiple Access (CDMA) cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104c may take the form of base stations within a digital cellular network, and the user device 120 and location trackers 122, 124 may include a cellular transceiver and processor that can exploit the base station signals to derive position. Such cellular networks may include, but are not limited to, standards in accordance with Global System for Mobile Communications (GSM), CDMA, 2G, 3G, 4G, Long-Term Evolution (LTE), 5G, New Radio (NR), etc. It should be understood that digital cellular network may include additional base stations or other resources that may not be shown in FIG. 1. While WAN-WAPs 104a-104c may actually be moveable or otherwise capable of being relocated, for illustration purposes it will be assumed that they are essentially arranged in a fixed position.

The user device 120 and location trackers 122, 124 may perform position determination using known time-of-arrival (TOA) techniques such as, for example, Advanced Forward Link Trilateration (AFLT). In other aspects, each WAN-WAP 104a-104c may comprise a WiMAX wireless networking base station. In this case, the user device 120 and location trackers 122, 124 may determine its position using TOA techniques from signals provided by the WAN-WAPs 104a-104c. The user device 120 and location trackers 122, 124 may determine positions either in a stand-alone mode, or using the assistance of a positioning server 110 and network 112 using TOA techniques, as will be described in more detail below. Furthermore, various aspects may have the user device 120 and location trackers 122, 124 determine position information using WAN-WAPs 104a-104c, which may have different types. For example, some WAN-WAPs 104a-104c may be cellular base stations, and other WAN-WAPs 104a-104c may be WiMAX base stations. In such an operating environment, the user device 120 and location trackers 122, 124 may be able to exploit the signals from each different type of WAN-WAP 104a-104c, and further combine the derived position solutions to improve accuracy.

When deriving position using the WLAN, the user device 120 and location trackers 122, 124 may utilize TOA techniques with the assistance of the positioning server 110 and the network 112. The positioning server 110 may communicate to the user device 120 and location trackers 122, 124 through network 112. Network 112 may include a combination of wired and wireless networks that incorporate the LAN-WAPs 106a-106c. In one embodiment, each LAN-WAP 106a-106c may be, for example, a Wi-Fi wireless access point, which is not necessarily set in a fixed position and can change location. The position of each LAN-WAP 106a-106c may be stored in the positioning server 110 in a common coordinate system. In one embodiment, the position of the user device 120 and location trackers 122, 124 may be determined by having the user device 120 and location trackers 122, 124 receive signals from each LAN-WAP 106a-106c. Each signal may be associated with its originating LAN-WAP based upon some form of identifying information that may be included in the received signal (such as, for example, a MAC address). The user device 120 and location trackers 122, 124 may then sort the received signals based upon signal strength, and derive the time delays associated with each of the sorted received signals. The user device 120 and location trackers 122, 124 may then form a message that can include the time delays and the identifying information of each of the LAN-WAPs, and send the message via network 112 to the positioning server 110. Based upon the received message, the positioning server 110 may then determine a position, using the stored locations of the relevant LAN-WAPs 106a-106c, of the user device 120 and location trackers 122, 124. The positioning server 110 may generate and provide a Location Configuration Indication (LCI) message to the user device 120 and location trackers 122, 124 that includes a pointer to the position of the user device 120 and location trackers 122, 124 in a local coordinate system. The LCI message may also include other points of interest in relation to the location of the user device 120 and location trackers 122, 124. When computing the position of the user device 120 and location trackers 122, 124, the positioning server 110 may take into account the different delays which can be introduced by elements within the wireless network.

The position determination techniques described herein may be used for various wireless communication networks such as a WWAN, a WLAN, a wireless personal area network (WPAN), and so on. The term "network" and "system" may be used interchangeably. A WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as cdma2000, Wideband-CDMA (W-CDMA), and so on. cdma2000 includes IS-95, IS-2000, and IS-856 standards. A TDMA network may implement GSM, Digital Advanced Mobile Phone System (D-AMPS), or some other RAT. GSM and W-CDMA are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of a WWAN, WLAN and/or WPAN.

In an aspect, the user device 120 may be suitably linked to the wearable location tracker 122 and the asset tracker 124 over a local network/interface, such as a Wi-Fi network, a Bluetooth® network, an LTE-Direct network, a Radio Frequency Identifier (RFID) interface, a Near-Field Communication (NFC) interface, a wired connection, etc. As described further herein, the wearable location tracker 122 and the asset tracker 124 may periodically send their current positions and navigation states (e.g., direction, velocity, geofence breach status, etc.), and possibly other information, to the user device 120 over the local network/interface. The wearable location tracker 122 and the asset tracker 124 may also report their positions and navigation states to the positioning server 110 over a WWAN or WLAN, and the positioning server 110 may send this information to the user device 120 over a WWAN or WLAN. The user device 120 may store an association between the last known position and navigation state associated with the wearable location tracker 122 and the asset tracker 124 at the last time that the user device 120 was linked to the wearable location tracker 122 and the asset tracker 124, or the last time it received that information from the positioning server 110.

Figure 2:
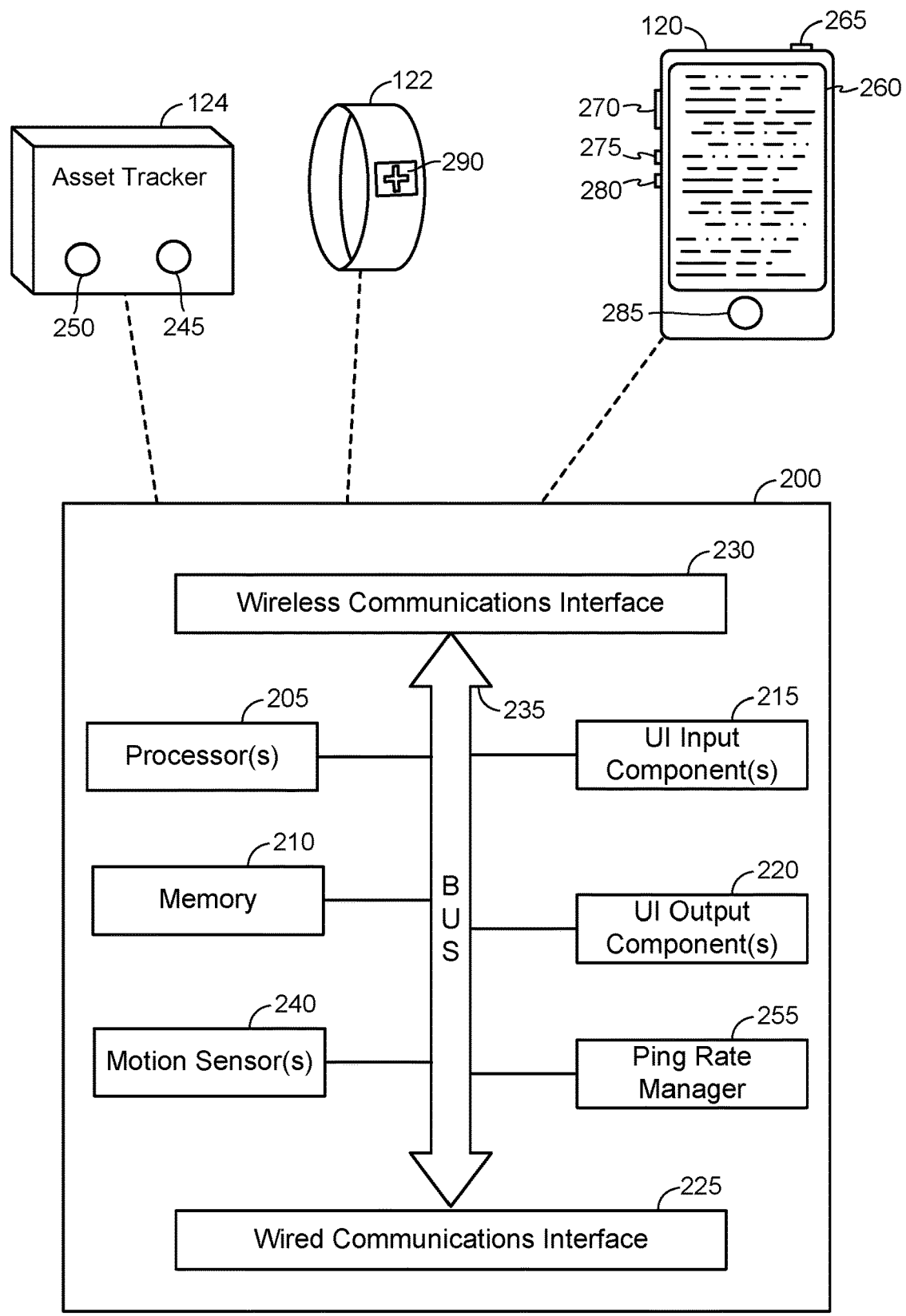
FIG. 2 illustrates an example mobile device in accordance with an aspect of the disclosure.

FIG. 2 illustrates a mobile device 200 in accordance with an aspect of the disclosure. In an aspect, the mobile device 200 includes one or more processors 205 (e.g., one or more ASICs, one or more digital signal processors (DSPs), a multicore processor, one or more communication controllers, etc.) and a memory 210 (e.g., Random Access Memory (RAM), Read-Only Memory (ROM), erasable programmable ROM (EPROM), Electrically Erasable Programmable ROM (EEPROM), flash cards, or any memory common to computer platforms). The mobile device 200 also includes one or more user interface (UI) input components 215 (e.g., a keyboard and mouse, a touchscreen, a microphone, one or more buttons such as volume or power buttons, etc.) and one or more UI output components 220 (e.g., speakers, a display screen, a vibration device for vibrating the mobile device 200, etc.).

The mobile device 200 further includes a wired communications interface 225 and a wireless communications interface 230. In an example aspect, the wired communications interface 225 can be used to support wired local connections to peripheral devices (e.g., a Universal Serial Bus (USB) connection, a mini USB or Lightning connection, a headphone jack, a graphics port, such as serial, Video Graphics Array (VGA), High-Definition Multimedia Interface (HDMI), Digital Visual Interface (DVI), or DisplayPort, audio ports, and so on) and/or to a wired access network (e.g., via an Ethernet cable or another type of cable that can function as a bridge to the wired access network such as HDMI v1.4 or higher, etc.). In another example aspect, the wireless communications interface 230 includes one or more wireless transceivers for communication in accordance with a local wireless communications protocol (e.g., WLAN or WiFi, WiFi Direct, LTE-Direct, Bluetooth®, etc.). The wireless communications interface 230 may also include one or more wireless transceivers for communication with a cellular RAN (e.g., via CDMA, W-CDMA, TDMA, FDMA, OFDM, GSM, or other protocols that may be used in a wireless communications network or a data communications network). The various components 205-230 of the mobile device 200 can communicate with each other via a bus 235.

Referring to FIG. 2, the mobile device 200 may correspond to any type of wireless mobile communications device, including but not limited to a smartphone, a laptop computer, a tablet computer, a wearable device (e.g., a pedometer, a smart watch, smart glasses, a wearable location tracker, etc.), a location tracker, and so on. Thus, the user device 120, the wearable location tracker 122, and the asset tracker 124 may be particular examples of the mobile device 200 in some implementations. In the example of FIG. 2, the asset tracker 124 includes a button 245 and a Light-Emitting Diode (LED) 250. The button 245 may be an example of a UI input component(s) 215 and the LED 250 may be an example of a UI output component(s) 220. While not shown explicitly as part of the asset tracker 124, the asset tracker 124 can include one or more external antennas and/or one or more integrated antennas that are built into the external casing of the asset tracker 124, including but not limited to WiFi antennas, cellular antennas, SPS antennas, and so on.

The wearable location tracker 122 includes a touchscreen display 290 and at least one button (not shown), among other components, as is known in the art. The button may be an example of a UI input component(s) 215 and the touchscreen display 290 may be an example of a UI input component(s) 215 and a UI output component(s) 220. While not shown explicitly as part of the wearable location tracker 122, the wearable location tracker 122 can include one or more external antennas and/or one or more integrated antennas that are built into the external casing of the wearable location tracker 122, including but not limited to WiFi antennas, cellular antennas, SPS antennas, and so on.

In the example of FIG. 2, the user device 120 is configured with a touchscreen display 260, peripheral buttons 265, 270, 275, and 280 (e.g., a power control button, a volume or vibrate control button, an airplane mode toggle button, etc.), and at least one front-panel button 285 (e.g., a Home button, etc.), among other components, as is known in the art. The buttons 265-285 may be examples of UI input component(s) 215 and the touchscreen display 260 may be an example of a UI input component(s) 215 and a UI output component(s) 220. While not shown explicitly as part of the user device 120, the user device 120 can include one or more external antennas and/or one or more integrated antennas that are built into the external casing of the user device 120, including but not limited to WiFi antennas, cellular antennas, SPS antennas, and so on.

One or more motion sensors 240 may be coupled to the processor(s) 205 to provide movement and/or orientation information which is independent of motion data derived from signals received by the WAN-WAPs 104, the LAN-WAPs 106 and the SPS satellites 102. By way of example, the motion sensor(s) 240 may include an accelerometer (e.g., a microelectromechanical system (MEMS) device), a gyroscope, a geomagnetic sensor (e.g., a compass), an altimeter (e.g., a barometric pressure altimeter), and/or any other type of movement detection sensor. Moreover, the motion sensor(s) 240 may include a plurality of different types of devices and combine their outputs in order to provide motion information. For example, the motion sensor(s) 240 may use a combination of a multi-axis accelerometer and orientation sensors to provide the ability to compute positions in 2D and/or 3D coordinate systems.

The mobile device 200 may also include a ping rate manager 255. Although the ping rate manager 255 is illustrated as connected to the bus 235, the ping rate manager 255 may be a software module stored in the memory 210 and executable by one or more of processor(s) 205, a separate hardware circuit coupled to the bus 235, a sub-component of one or more of processor(s) 205, a combination of hardware and software, or the like.

In an aspect, the ping rate manager 255 may perform, or execution of the ping rate manager 255 may cause the mobile device 200 to perform, the operations described herein. Thus, for example, the processor(s) 205, the memory 210, the wireless communications interface 230, the wired communications interface 225, and/or the ping rate manager 255 may all be used cooperatively to load, store, and execute the various operations disclosed herein, and as such, the logic to perform these operations may be distributed over various elements. Alternatively, the functionality could be incorporated into one discrete component (e.g., the ping rate manager 255). Therefore, the features of the mobile device 200 are to be considered merely illustrative and the disclosure is not limited to the illustrated features or arrangement.

For example, in an aspect, the ping rate manager 255 may cause the processor 205 to perform operations comprising detecting (e.g., based on data from wireless communications interface 230) a breach of a geofence made by a location tracking device (e.g., mobile device 200), receiving (e.g., from wireless communications interface 230 and/or motion sensor(s) 240) data representing a state of the location tracking device, the state of the location tracking device comprising at least a current location of the location tracking device and a velocity of the location tracking device, and determining, based on the data representing the state of the location tracking device, the predicted location of the location tracking device.

The present disclosure provides techniques to improve the battery life of location trackers and similar devices. For example, a location tracker can use various heuristics to analyze real-time data points from both the location tracker and optionally the device receiving the location updates (referred to as the "receiver," and which may be user device 120), and automatically adjust the location tracker's ping rate in order to extend the battery life and efficiency of the location tracker. In addition, the present disclosure provides techniques to predict the path(s) and areas-of-travel of a location tracker to allow the user to intercept, rather than follow, the person or property associated with the location tracker.

Example data points from the location tracker that may be useful for the techniques described herein include, but are not limited to, the battery level of the location tracker, location, velocity/speed of the location tracker, trajectory/direction of the location tracker, WLAN access point connection(s), gyroscope state, accelerometer state, built environment (e.g., buildings, open spaces, roads, construction, traffic, etc.), the type of valuable to which the location tracker is attached (e.g., person, pet, property, indicating whether the location tracker is moving under its own power, or being carried), and any historical values of the above data. Example data points from the receiver that may be useful for the techniques described herein include, but are not limited to, location of the receiver, velocity/speed of the receiver, trajectory/direction of the receiver, WLAN access point connection(s), gyroscope state, accelerometer state, built environment, traffic conditions near the receiver, and any historical values of the above data. Sources of the above data points include, but are not limited to, UPS, gyroscope, accelerometer, serving base station, battery system, serving WLAN access point, Internet connection (e.g., over a cellular network or a WLAN), and the like.

The receiver, or location tracker if it has sufficient battery level and processing capability, can analyze these real-time data points to determine the optimal ping rate and, if the location tracker has breached a geofence, the best path for (the user of) the receiver to reach/intercept the location tracker, the projected travel path of the location tracker, and/or the likely area of the projected travel. If the location tracker is performing this analysis, it can send the results to the receiver. The receiver can then display this information for the user. For simplicity, the analysis of the collected data is described herein as being performed by one device or the other. However, as will be appreciated, such analysis may be performed by either device, depending on their capabilities and battery level.

In an exemplary scenario (set of heuristics), if the location tracker has recently pinged the receiver (i.e., sent a location update to the receiver, e.g., within the past five minutes) and the location tracker is running low (below some threshold, e.g., 30%) on battery, then the location tracker may, or the receiver may instruct the location tracker to, decrease the ping rate. The purpose of such a rule is to, for example, conserve battery where the location tracker has likely not moved significantly since the most recent ping.

In a second exemplary scenario (set of heuristics), if the location tracker is within a designated geofence, then regardless of the battery level of the location tracker, the location tracker may, or the receiver can instruct the location tracker to, stop pinging the receiver to conserve the battery of the location tracker. The purpose of such a rule is to, for example, conserve battery where the location tracker is known to be at a permitted location (i.e., within a geofence). However, in an alternative, the user may prefer an occasional ping while the location tracker is within the geofence, simply to assure the user that the location tracker is still operational. Such an occasional ping could be overridden to save battery power.

In a third exemplary scenario (set of heuristics), if the location tracker is stationary (as determined from data from the motion sensor(s) 240), regardless of whether or not it has breached a geofence or is running low on battery, the location tracker may reduce the ping rate, or stop pinging altogether, until it begins moving again. The purpose of such a rule is to, for example, reduce or eliminate unnecessary location updates, because if the location tracker is not moving, its location is likely not changing.

In a fourth exemplary scenario (set of heuristics), if the location tracker breaches a designated geofence, regardless of whether low on battery (below some threshold) or fully (or above some threshold) charged, then the location tracker alerts the receiver that it is outside of the geofence and provides an initial location. The purpose of such a rule is to, for example, immediately alert the user to a breach, as this may be a desired behavior of a location tracker, regardless of battery level.

Upon detecting a breach, the location tracker can begin analyzing any available sensor data in real-time, and direct the receiver accordingly. For example, in an aspect, if the battery on the location tracker is running low (e.g., below 30%), then the location tracker or the receiver can determine the time until the receiver can intercept the location tracker based on, for example, the location tracker's current location, speed, and direction of travel and the receiver's current location, speed, and direction of travel, for example. The location tracker can then adjust the ping rate to optimize its battery life. For example, the location tracker can send its location to the receiver prior to any inflection or decision points in the receiver's path (e.g., before the receiver would need to turn onto a different road), thereby sending its location when it is most useful. The location tracker can also increase the ping rate as the receiver gets closer to the location tracker to allow for more efficient course correction by the receiver. In an aspect, the location tracker can notify the receiver that it is varying the ping rate for efficiency, so that the receiver can then notify the user. Regardless of the location tracker's battery life, it can predict when the battery will reach zero and automatically reduce the ping rate to extend the battery life. In an aspect, the location tracker may also collect data points from nearby WLAN access points to determine its location and/or predict possible travel paths. Possible travel paths may be based on contextual data points such as a road map of the area, the built environment, and the like. In an aspect, if the location tracker's battery level does reach zero before it is found, the location tracker, or the receiver, can calculate potential travel paths by analyzing: historical paths (prior paths traveled by the location tracker), the time when the geofence was breached, the last distance recorded, WLAN access points recorded nearby, its trajectory and rate of speed, the built environment in the context of its current/projected location, and/or the like.

Based on the information received from the location tracker, the user interface of the receiver can display various information and/or notifications to the user to communicate system status information in real-time. For example, regardless of the battery level of the location tracker, the receiver can display a map view showing the location tracker's most recent location, a history of the locations of the location tracker since the geofence breach, optionally connected by a line, thereby showing the likely path followed, the most-likely path (informed by real-time and stored sensor data, history, contextual built environment, traffic, etc.) of the location tracker beyond the most recent location, and a "bubble" around the likely area of travel (which may differ or veer slightly from the most likely path). In an aspect, the diameter of the visual bubble may vary with the level of confidence in the prediction and the odds of a particular travel path. A small bubble area would indicate a high confidence, and a large bubble area would indicate a lower confidence.

In an aspect, if the battery level of the location tracker does go to zero, the user interface of the receiver can provide an indication of such with a zero battery level icon. In an aspect, the receiver can also increase the size of the bubble (i.e., the geographic area of the bubble), thereby showing a decreased confidence in the likely area of travel, and may also provide a notification that the confidence level is likely to decrease due to the lack of continuous real-time data. The receiver can continue to increase the likely area of travel bubble as time passes to indicate the greater odds of multiple travel paths.

The receiver can also communicate to the user (via one or more notifications) as to why the ping rate is variable and its efficiency in helping the user to more effectively intercept the location tracker.

As will be appreciated, the foregoing description of the user interface is exemplary, and the disclosure is not limited to the aspects and features described above.

Figure 3:
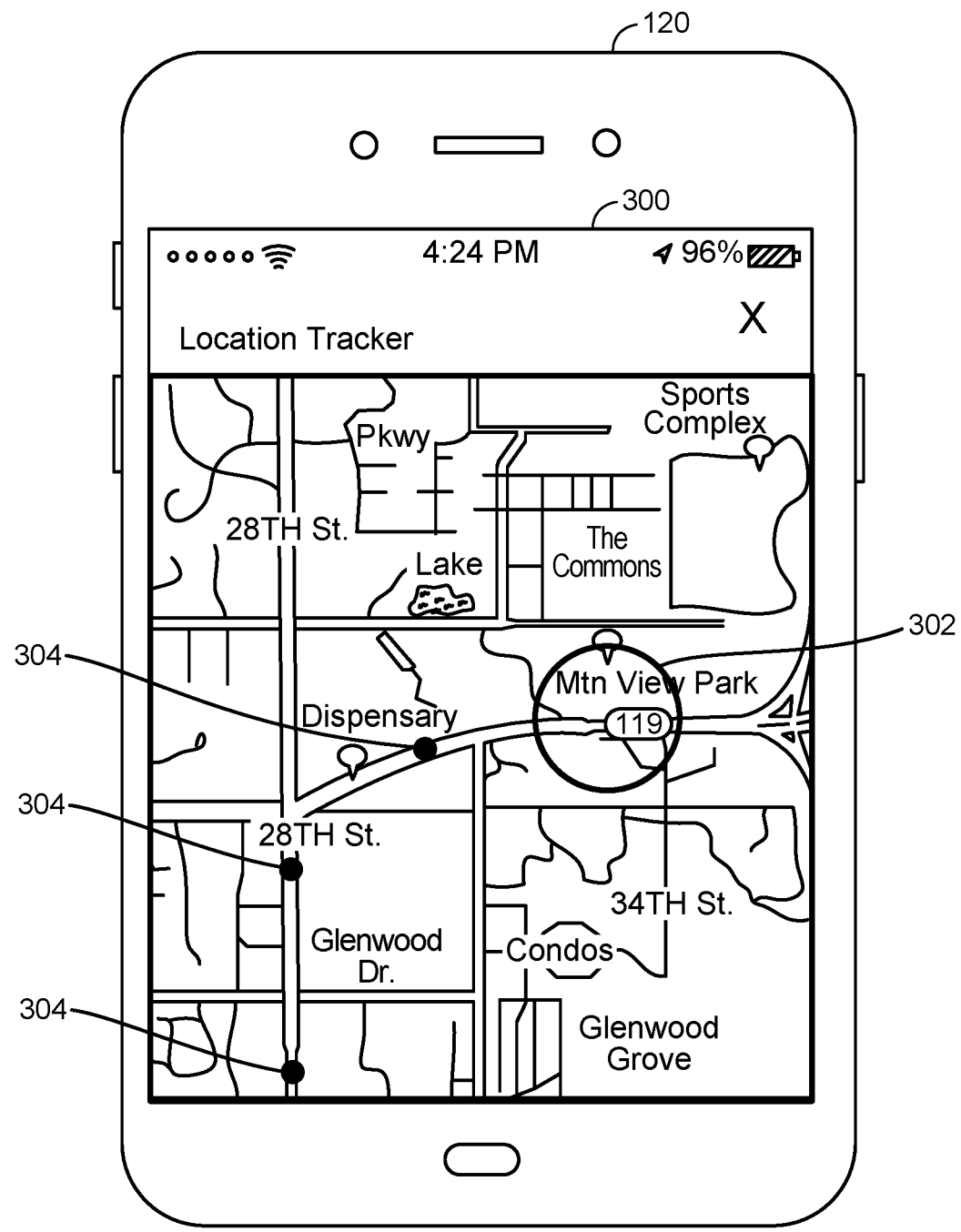
FIG. 3 illustrates an example user interface of the user device according to an aspect of the disclosure.

FIG. 3 illustrates an example user interface 300 of the user device 120 according to an aspect of the disclosure. In the example of FIG. 3, the user interface 300 displays a map of previous ping locations of a location tracker (e.g., wearable location tracker 122, asset tracker 124) as previous locations 304a-c, and a likely area of travel 302, calculated as described above. In the example of FIG. 3, the likely area of travel 302 indicates where the location tracker will be when it sends the next location ping. As shown in FIG. 3, previous location 304b was provided to the receiver before it needed to turn off of 28th Street and onto Route 119. The location tracker may have provided this location ping based on knowledge that the receiver was approaching the intersection of 28th Street and onto Route 119 and would need to turn onto Route 119.

Once the receiver begins moving towards the location tracker, the receiver (or the location tracker if it has the requisite memory and processing capability) can begin analysis of the receiver's available real-time sensor data, such as its location, trajectory/direction, velocity/speed, etc. as well as available data from the location tracker, such as the battery level, previous locations, trajectory/direction, velocity/speed, etc. The receiver (or location tracker) can combine the data points (both the data from the receiver and the data from the location tracker) to predict a future location of the location tracker, to enable the receiver (or location tracker) to determine the most accurate and effective path to intercept the location tracker.

As noted above, the receiver can also notify the user that the location tracker's ping rate will vary to save battery life and to be more effective at helping the user intercept the location tracker as quickly as possible. As also noted above, if the battery level is above a threshold (e.g., 50%), the location tracker (optionally as directed by the receiver) can increase the ping rate as the receiver gets closer to the location tracker, allowing for more efficient course correction. However, if the battery level is below some threshold (e.g., 20%), the location tracker (optionally as directed by the receiver) can decrease the ping rate to only provide location updates at the most important actionable inflection points for the receiver (e.g., location 304b), and increase the ping rate only as necessary as the receiver nears the location tracker for greater efficiency in possible course corrections.

Figure 4:
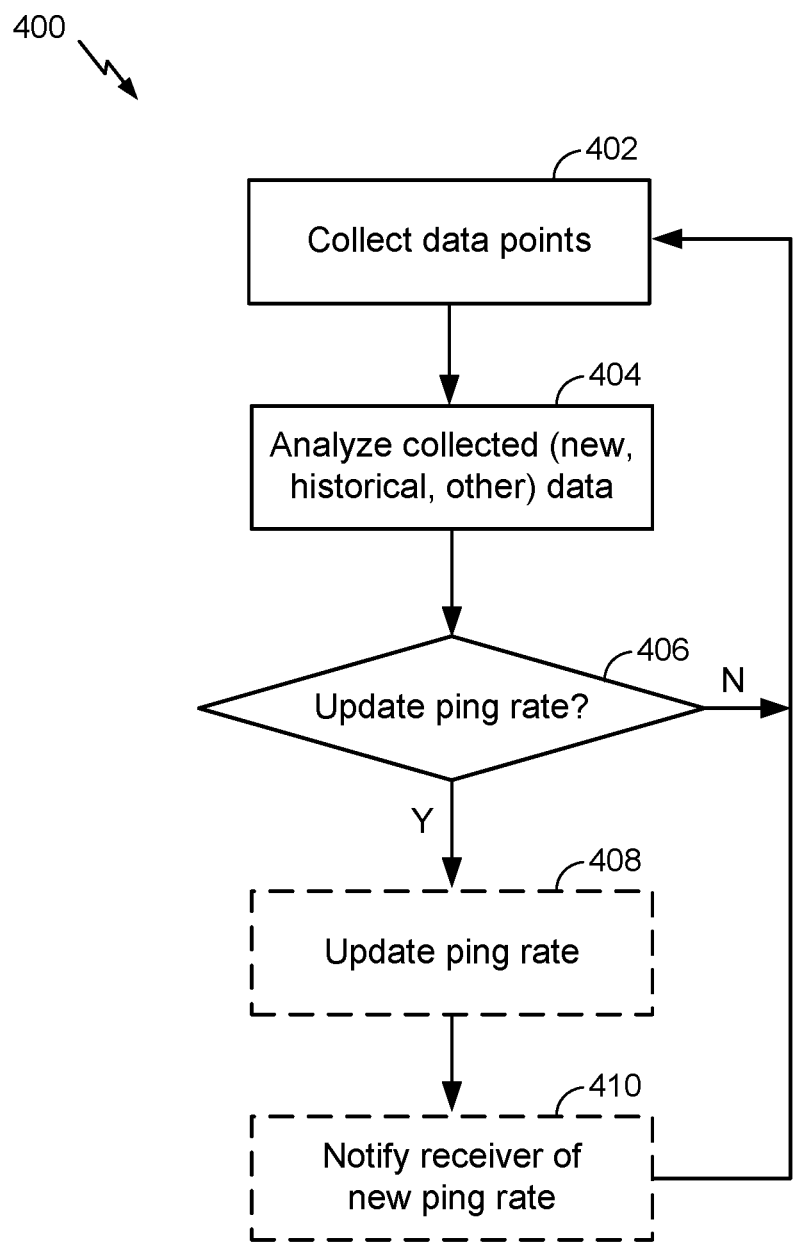
FIG. 4 illustrates an exemplary method for updating the ping rate of a location tracker, according to an aspect of the disclosure.

FIG. 4 illustrates an exemplary method 400 for updating the ping rate of a location tracker, according to an aspect of the disclosure. The method 400 may be performed by the mobile device 200, for example, the user device 120, the wearable location tracker 122, or the asset tracker 124. Alternatively, in an aspect, the method 400 may be performed by the positioning server 110. At 402, the mobile device 200 (e.g., ping rate manager 255, or processor(s) 205 as directed by execution of ping rate manager 255) begins collecting (gathering) available data points from the location tracker, such as the location of the location tracker, its battery level, whether or not it is within or has breached a geofence (e.g., a geofence stored in memory 210), whether or not the location tracker is in motion (e.g., being carried as opposed to resting in place, which may be determined from motion sensor(s) 240), its distance from the receiver (e.g., user device 120), and the like, as described above. The mobile device 200, when corresponding to a location tracker, may obtain such information from the motion sensor(s) 240, the wired communications interface 225, the wireless communications interface 230, and/or the UI input component(s) 215. The mobile device 200, when corresponding to a receiver, may obtain such information from the location tracker via the wired communications interface 225 and/or the wireless communications interface 230 (and optionally via positioning server 110). The mobile device 200 may also retrieve previously stored (historic) data points from memory 210. The mobile device 200 may also collect available data points from the receiver, such as the location of the receiver, whether or not the receiver is in motion (e.g., being carried or driven in pursuit of the location tracker), its distance from the location tracker, upcoming inflection points (e.g., turns along the route from the receiver to the location tracker), and the like, as described above. In an aspect, where the mobile device 200 corresponds to a location tracker, the mobile device 200 may periodically receive the above data points from the receiver and may calculate its distance from the receiver based on the last-received location of the receiver. Alternatively, the receiver may send the above data points to the location tracker in response to receiving the notification of the geofence breach. As yet another alternative, the location tracker may not know anything about the receiver.

At 404, the mobile device 200 (e.g., ping rate manager 255, or processor(s) 205 as directed by execution of ping rate manager 255) analyzes the collected data to determine the state of the location tracker, and optionally the receiver, and therefore enable it to determine, at 406, whether or not to update the ping rate. For example, the mobile device 200 may determine whether or not the battery level of the location tracker is below a threshold, and if it is, determine, at 406, to reduce the ping rate to conserve battery. As another example, if the location tracker has breached a stored geofence and has a battery level below a threshold, but the receiver is beyond a threshold distance away from the location tracker, the mobile device 200 may determine, at 406, to decrease the ping rate to conserve battery, as the receiver is unlikely to need fine/frequent position estimates of the location tracker given the larger distance between the two devices. As yet another example, if the receiver is nearing an inflection point on its route to the location tracker (as determined from the route calculated by the location tracker from the last known location of the receiver and the predicted location of the location tracker, or by the receiver from the current location of the receiver and the predicted location of the location tracker), the mobile device 200 may determine, at 406, to increase the ping rate, or send an additional ping to the receiver, before the receiver reaches the inflection point to enable the receiver to make the correct turn.

As another example, if the location tracker has breached a stored geofence, has a battery level above a threshold, and optionally, is within a threshold distance of the receiver, the mobile device 200 may determine, at 406, to increase the ping rate, to enable the receiver to more quickly intercept and recover the location tracker. As yet another example, if the location tracker has breached a stored geofence, has a battery level above a threshold, but is beyond a threshold distance from the receiver, the mobile device 200 may determine, at 406, to decrease the ping rate to conserve battery, as the user will be less likely, given the greater distance, to be able to quickly intercept and recover the location tracker. As will be appreciated, these are merely examples, and the present disclosure is not limited to only these examples. Rather, as would be appreciated by one of ordinary skill in the art, there are numerous heuristics (rules) based on the location tracker's location, battery level, breach state, distance from the receiver, and the like that can be used to determine an optimal ping rate for the location tracker.

At 408, the mobile device 200 (e.g., ping rate manager 255, or processor(s) 205 as directed by execution of ping rate manager 255) optionally updates the ping rate, by either increasing or decreasing the ping rate, as determined at 406. The ping rate may be selected from a range of values corresponding to different ping rates (e.g., 1 to 10, where one is the most infrequent and 10 is the most frequent), and the mobile device 200 may increase or decrease the ping rate one or more levels at a time, depending on the conditions determined at 404. Alternatively, the mobile device 200 may calculate an optimum ping rate based on the data analyzed at 404. Operation 408 is optional because the ping rate may not need to be adjusted.

At 410, the mobile device 200 (e.g., wireless communications interface 230 as directed by ping rate manager 255 or processor(s) 205) optionally sends a notification to the receiver indicating that the ping rate has been updated. The notification may include the new ping rate. Operation 410 is optional because the ping rate may not have been adjusted at 408. The flow then returns to 402. More specifically, the mobile device 200 may continuously or periodically (e.g., every minute, every five minutes, etc.) perform the method 400 to adjust the ping rate as needed to optimize both the location tracking and the battery consumption of the location tracker.

Figure 5A:
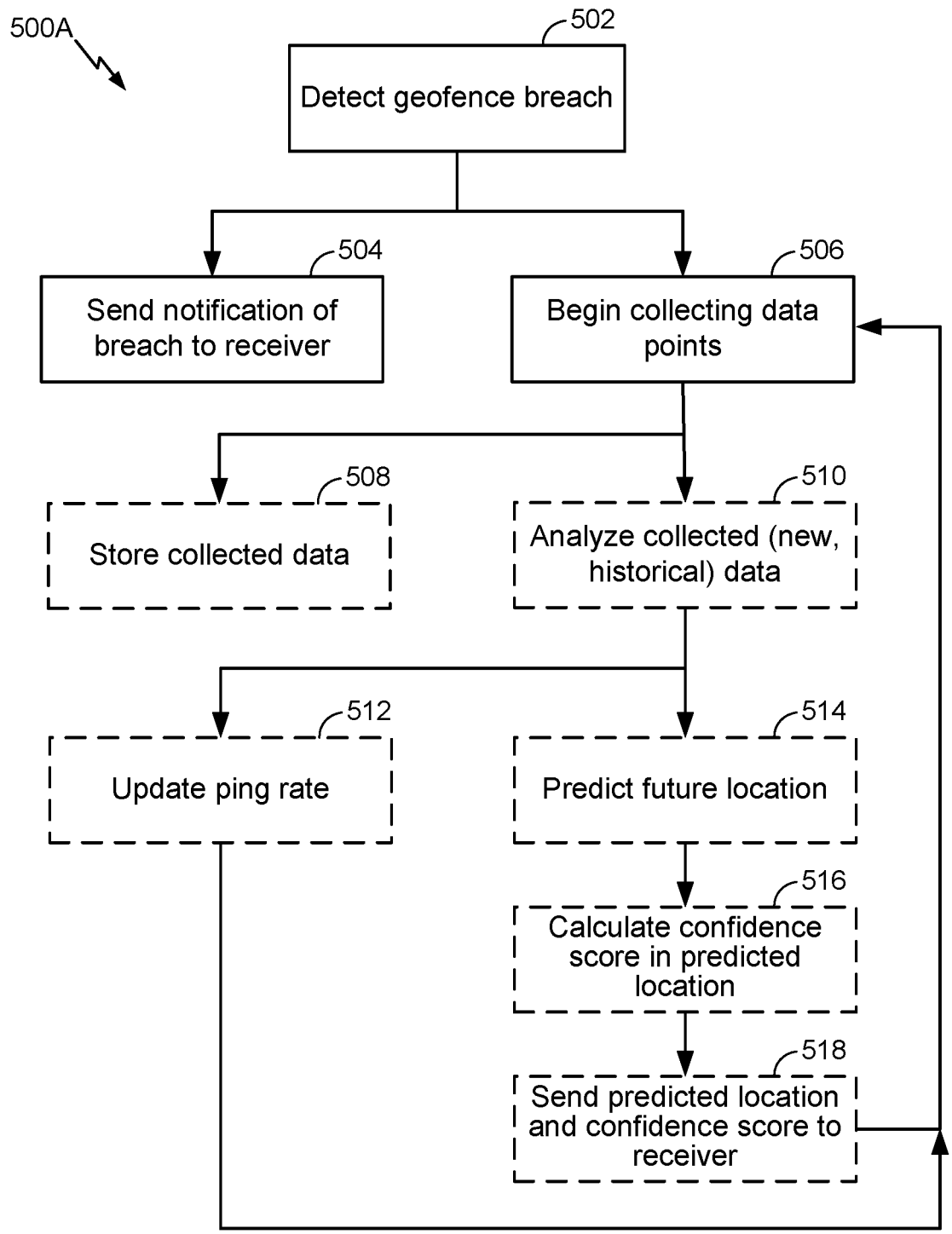
FIGS. 5A and 5B illustrate exemplary methods for enabling the receiver to intercept a location tracker, according to aspects of the disclosure.
Figure 5B:
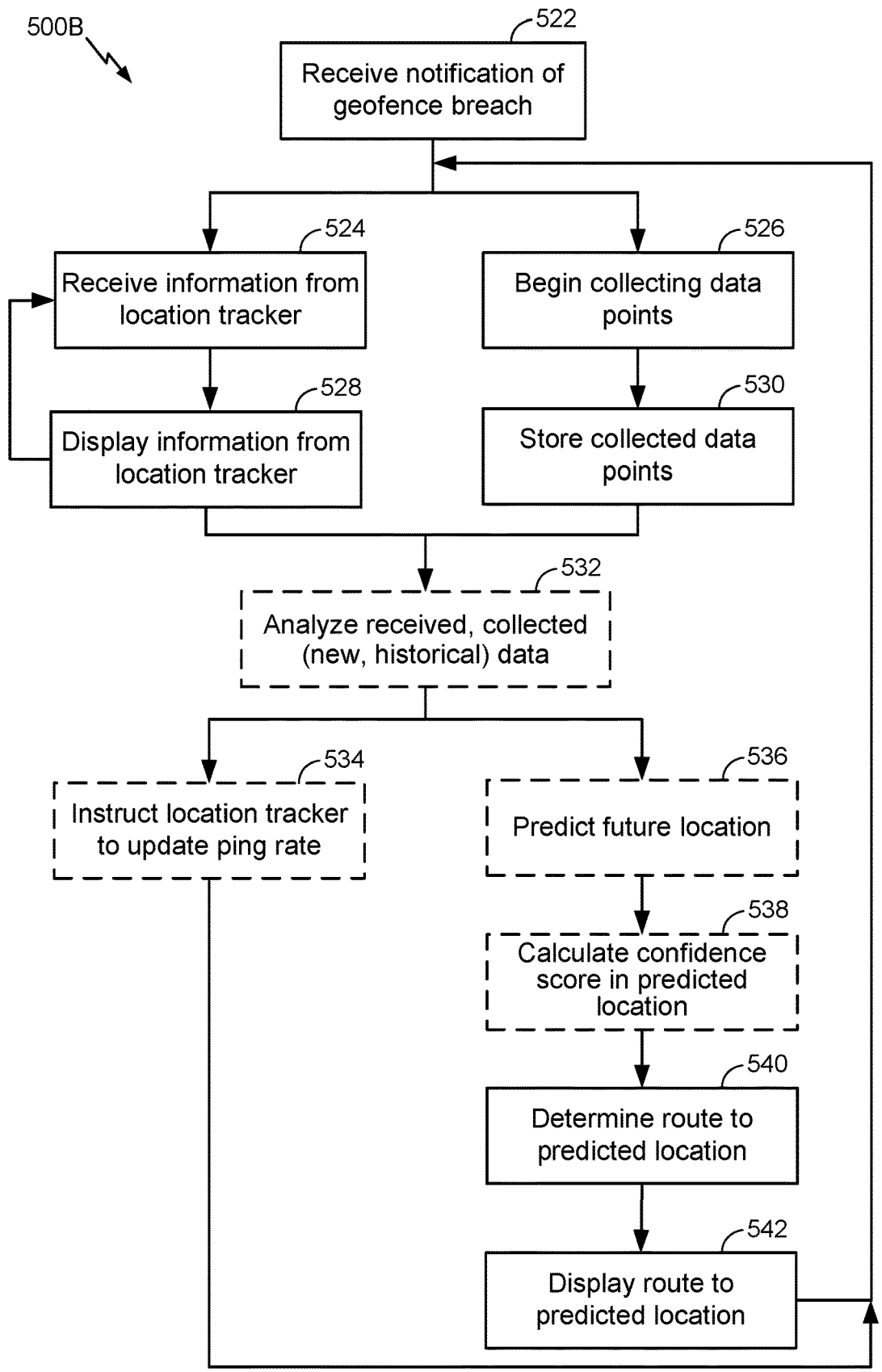

FIGS. 5A and 5B illustrate exemplary methods for enabling a receiver (e.g., user device 120) to intercept a location tracker (e.g., wearable location tracker 122 or asset tracker 124), according to aspects of the disclosure. The exemplary method 500A of FIG. 5A may be performed by the location tracker (e.g., wearable location tracker 122 or asset tracker 124), and the exemplary method 500B of FIG. 5B may be performed by the receiver (e.g., user device 120). Alternatively, these methods may be performed by the positioning server 110 based on information from the receiver and/or location tracker.

At 502, the location tracker (e.g., ping rate manager 255, or processor(s) 205 as directed by execution of ping rate manager 255) detects a geofence breach. The breach may be detected by comparing positioning information determined from, for example, wireless communications interface 230 (e.g., GPS location, serving WLAN access point identity, serving cellular base station identity, loss of short-range wireless connection to the receiver (e.g., Bluetooth®, RFID, NFC, or the like), or the like) compared to the geographic boundaries of a geofence stored in memory 210.

At 504, the location tracker (e.g., wireless communications interface 230, as directed by ping rate manager 255 or processor(s) 205) sends a notification to the receiver indicating that the location tracker has breached the geofence. The notification may include an identification of the geofence (where the location tracker stores multiple geofences in memory 210), the location of the breach, the time of the breach, the location tracker's velocity and direction at the time of the breach, battery level at the time of the breach, and/or the like.

At the same time, at 506, the location tracker (e.g., ping rate manager 255, or processor(s) 205 as directed by execution of ping rate manager 255) begins collecting (gathering) available data points from the location tracker, such as the location of the location tracker, its velocity and trajectory, its battery level, whether or not the location tracker is in motion (e.g., being carried as opposed to resting in place, which may be determined from motion sensor(s) 240), its distance from the receiver (e.g., user device 120), the built environment of the location tracker (which may be determined based on the number of nearby WLAN access points and/or cellular base stations), and the like, as described above. The location tracker may obtain such information from the motion sensor(s) 240, the wired communications interface 225, the wireless communications interface 230, and/or the UI input component(s) 215. The location tracker may also retrieve previously stored (historic) data points from memory 210. The location tracker may also collect available data points from the receiver, such as the location of the receiver, whether or not the receiver is in motion (e.g., being carried or driven in pursuit of the location tracker), its distance from the location tracker, upcoming inflection points (e.g., turns along the route from the receiver to the location tracker), and the like, as described above. In an aspect, the location tracker may periodically receive these data points from the receiver and calculate its distance from the receiver based on the last-received location of the receiver. Alternatively, the receiver may send the above data points to the location tracker in response to receiving the notification of the geofence breach. As yet another alternative, the location tracker may not know anything about the receiver.

At 508, the location tracker (e.g., memory 210, as directed by ping rate manager 255 or processor(s) 205) optionally stores the collected data in memory 210. The stored data can be retrieved later as historic data points that can be used to learn behavior patterns of the location tracker and/or its wearer (whether a person, pet, or property) and thereby further optimize the ping rate and predicted location of the location tracker. Operation 508 is optional because the location tracker need not store the data collected at 506 in order to assist the receiver to intercept the location tracker. At 510, the location tracker (e.g., ping rate manager 255, or processor(s) 205 as directed by execution of ping rate manager 255) analyzes the collected data to determine the current state (and to the extent beneficial, the previous state(s)) of the location tracker, and possibly the receiver, to enable it to predict its future location and determine whether or not to update the ping rate at 512 and 514. The location tracker may determine whether or not to increase or decrease the ping rate at 512 as discussed above with reference to FIG. 4.

At 514, the location tracker (e.g., ping rate manager 255, or processor(s) 205 as directed by execution of ping rate manager 255) predicts a future location of the location tracker. The future location may be the location at which the location tracker is predicted to be at the next ping interval or a predicted destination of the location tracker. The future location may be predicted based on the location of the breach, the current location of the location tracker, the current velocity (rate of speed) and trajectory (direction) of the location tracker, physical characteristics of the object (person, animal, property) to which the location tracker is attached (e.g., a large shipping container will take longer and require different resources to move than, for example, a suitcase), the built environment of the location tracker (e.g., a vehicle on a highway will be able to travel further faster than a vehicle driving in a city), the traffic conditions in the area of the location tracker, historical locations of the location tracker stored in memory 210, and/or the like.

At 516, the location tracker (e.g., ping rate manager 255, or processor(s) 205 as directed by execution of ping rate manager 255) calculates a confidence score in the predicted location. The confidence score may be based on the factors upon which the predicted location itself is based, and in addition the amount of time into the future that the location tracker is predicted to be at the predicted location. That is, the further into the future the location tracker is predicted to be at the predicted location, the lower the confidence in the predicted location. In an aspect, the confidence score may be represented as a radius around the predicted location (e.g., likely area of travel 302 in FIG. 3), with a larger radius indicating a lower confidence score. However, this is an example, and the disclosure is not so limited.

At 518, the location tracker (e.g., wireless communications interface 230 as directed by ping rate manager 255 or processor(s) 205) sends the predicted location and the confidence score to the receiver. The method 500A then returns to 506, where the location tracker continues gathering data points. More specifically, the location tracker may continuously or periodically (e.g., every minute, every five minutes, etc.) perform the method 500A to update the predicted location and/or the ping rate as needed to optimize both the location prediction and the battery consumption of the location tracker.

Note that operations 510-518 are optional (as depicted by the dashed lines) because they can instead be performed by the receiver or positioning server 110 based on data received from the location tracker. More specifically, the location tracker may not have the processing capability or sufficient battery level to perform these operations. In that case, the location tracker can send the data points gathered at 506 to the receiver or positioning server 110, and the receiver or positioning server 110 can perform operations 510 and 514-518. If the receiver or positioning server 110 also performs operation 512, it can instruct the location tracker to update the ping rate.

Referring now to FIG. 5B, at 522, the receiver (e.g., wireless communications interface 230) receives the notification of the geofence breach that the location tracker sent at 504. At 524, the receiver (e.g., wireless communications interface 230, ping rate manager 255, or processor(s) 205) receives information from the location tracker. Initially, the information may be the information received in the notification, which may include an identification of the geofence (where the location tracker stores multiple geofences in memory 210), the location of the breach, the time of the breach, the location tracker's velocity and direction at the time of the breach, battery level at the time of the breach, and/or the like. Subsequently, the information may include status updates, such as battery level, current location, ping rate, motion state, and/or the like. The information received at 524 may also include the predicted location of the location tracker, the confidence score in the predicted location, and the time at which the location tracker is predicted to be at the predicted location, as sent by the location tracker at 518. At 528, the receiver (e.g., UI output component(s) 220 as directed by ping rate manager 255 or processor(s) 205) displays the information received from the location tracker. For example, as illustrated in FIG. 3, the receiver may display the previous locations 304 of the location tracker and the likely area of travel 302. The receiver will update the display of this information as new information is received at 524, as illustrated by the arrow returning to 524.

At 526, the receiver (e.g., ping rate manager 255, or processor(s) 205 as directed by execution of ping rate manager 255) begins collecting its own data points, such as its current location, velocity, trajectory, built environment, traffic conditions, and/or the like. The receiver may obtain such information from the motion sensor(s) 240, the wired communications interface 225, the wireless communications interface 230, and/or the UI input component(s) 215. The receiver may also retrieve previously stored (historic) data points from memory 210. At 530, the receiver (e.g., memory 210, as directed by ping rate manager 255 or processor(s) 205) stores the collected data points. The stored data can be retrieved later as historic data points that can be used to learn behavior patterns of the receiver and/or location tracker and thereby further optimize the ping rate and predicted location of the location tracker.

At 532, the receiver (e.g., ping rate manager 255, or processor(s) 205 as directed by execution of ping rate manager 255) analyzes the received and collected data to determine the current state (and to the extent beneficial, the previous state(s)) of the receiver and/or the location tracker to enable the receiver to predict the future location of the location tracker and to determine whether or not to update the ping rate at 534 and 536. The receiver may determine whether or not to increase or decrease the ping rate at 534 as discussed above with reference to FIG. 4. The receiver may calculate the predicted location of the location tracker as discussed above with reference to 514. At 538, the receiver (e.g., ping rate manager 255, or processor(s) 205 as directed by execution of ping rate manager 255) may calculate a confidence score in the predicted location, as discussed above with reference to 516.

At 540, the receiver (e.g., ping rate manager 255, or processor(s) 205 as directed by execution of ping rate manager 255) determines a route to the predicted location, or at least to the area of the predicted location, such as where the confidence score is low. At 542, the receiver (e.g., UI output component(s) 220 as directed by ping rate manager 255 or processor(s) 205) displays the determined route. The method 500B then returns to 524/526 and repeats as new information is received from the location tracker and/or new information is collected by the receiver. Note that operations 532 to 538 are optional because these operations may be performed by the location tracker and the results received by the receiver at 524.

Figure 6:
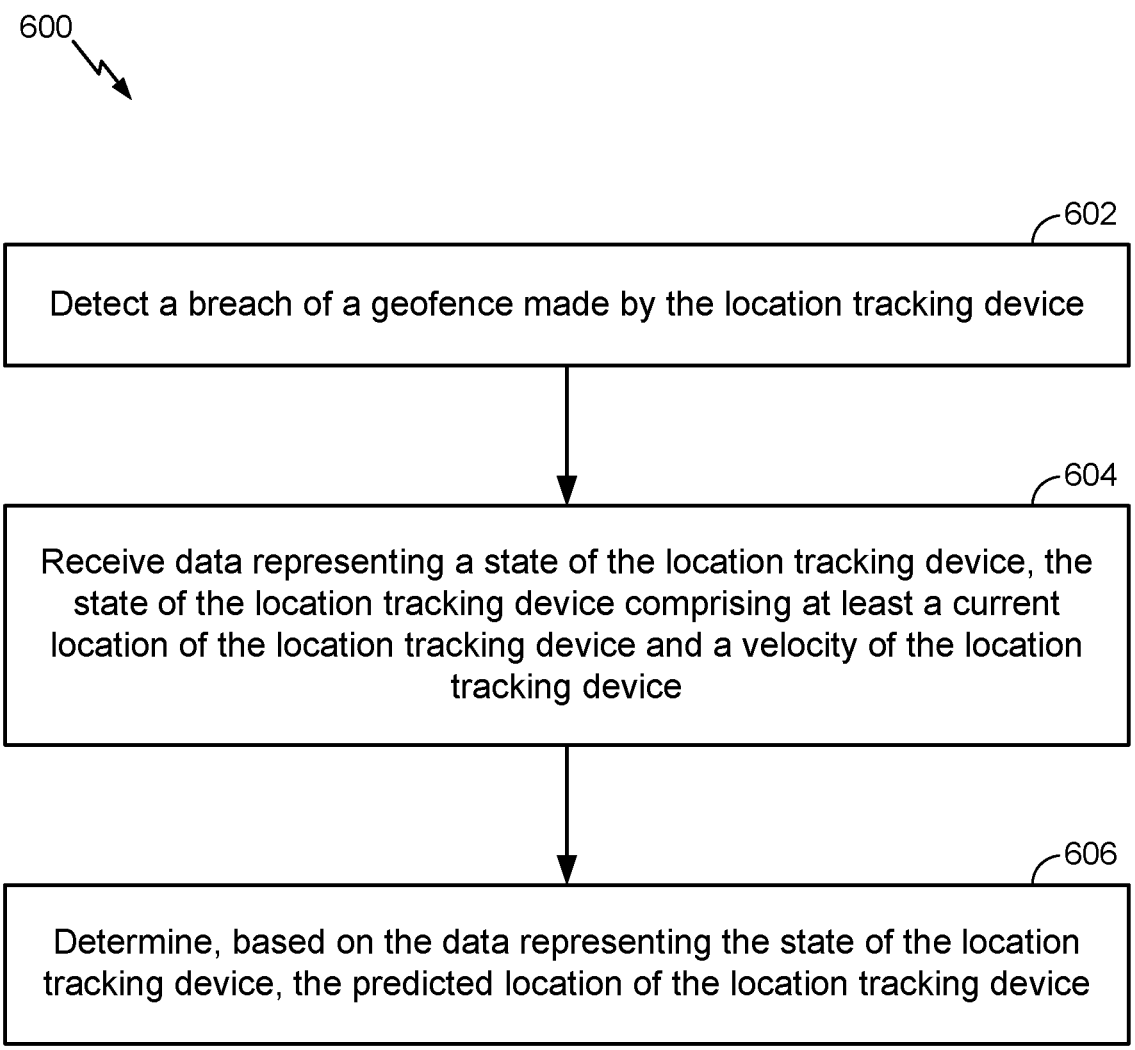
FIG. 6 illustrates an exemplary method for calculating a predicted location of a location tracking device, according to an aspect of the disclosure.

FIG. 6 illustrates an exemplary method 600 for calculating a predicted location of a location tracking device, according to an aspect of the disclosure. The method 600 may be performed by a location tracker, such as wearable location tracker 122 or asset tracker 124, or a receiver, such as user device 120.

At 602, the method 600 includes detecting (e.g., by ping rate manager 255 or processor(s) 205 based on data from wireless communications interface 230) a breach of a geofence made by the location tracking device, as at 502 and 522 of FIGS. 5A and 5B, respectively. At 604, the method 600 includes receiving (e.g., by ping rate manager 255 or processor(s) 205 based on data from wireless communications interface 230 and/or motion sensor(s) 240) data representing a state of the location tracking device, as at 506 and 524 of FIGS. 5A and 5B, respectively. In an aspect, the state of the location tracking device may include at least a current location of the location tracking device and a velocity of the location tracking device. At 606, the method 600 includes determining (e.g., by ping rate manager 255 or processor(s) 205 based on execution of ping rate manager 255), based on the data representing the state of the location tracking device, the predicted location of the location tracking device, as at 514 and 536 of FIGS. 5A and 5B, respectively. An advantage of determining the predicted location of the location tracking device is to enable the receiver device to intercept the location tracking device at the predicted location, rather than the receiver device being directed to a previous location of the location tracking device that the location tracking device may have vacated.

In an aspect, although not illustrated in FIG. 6, the method 600 may further include calculating (e.g., by ping rate manager 255 or processor(s) 205) a confidence score in the predicted location of the location tracking device. An advantage of calculating a confidence score is that it provides the user a realistic expectation of the accuracy of the predicted location of the location tracking device.

In an aspect, if the method 600 is performed by a location tracking device (e.g., wearable location tracker 122, asset tracker 124), the method may further comprise receiving a message from a receiver device (e.g., user device 120) associated with the location tracking device to increase a ping rate for the location tracking device based on detection of the breach of the geofence. Additionally, the data representing the state of the location tracking device may further include a battery level of the location tracking device, and the method 600 may further include updating (e.g., by ping rate manager 255 or processor(s) 205) a ping rate for the location tracking device based on the battery level of the location tracking device and the data representing the state of the location tracking device, as at 512 of FIG. 5A. An advantage of the location tracking device performing the method 600 is that there may be less latency in making decisions (such as updating the ping rate) and less wireless communication between the location tracking device and the receiver device. An advantage of updating the ping rate is that it can conserve the battery of the location tracking device, as described above.

The method 600 may further include sending (e.g., by wireless communications interface 230 as directed by ping rate manager 255 or processor(s) 205) a notification of the detected breach to a receiver device associated with the location tracking device, as at 504 of FIG. 5A, and sending the predicted location to the receiver device to enable the receiver device to intercept the location tracking device, as at 518 of FIG. 5A. An advantage of sending the breach notification and the predicted location of the location tracking device to the receiver device is to alert the user of the breach and enable the receiver device to intercept the location tracking device at the predicted location, rather than the receiver device being directed to a previous location of the location tracking device that the location tracking device may have vacated. In an aspect, the location tracking device may receive the data representing the state of the location tracking device from motion sensor(s) 240 and/or wireless communications interface 230.

In an aspect, if the method 600 is performed by a receiver device (e.g., user device 120) associated with the location tracking device, the method 600 may further comprise sending a message to the location tracking device to increase a ping rate for the location tracking device based on detection of the breach of the geofence. Additionally, detecting the breach at 602 may be based on reception of a breach notification from the location tracking device, as at 522 of FIG. 5B, and the receiver device may receive the data representing the state of the location tracking device from the location tracking device, as at 524 of FIG. 5B. In an aspect, the method 600 may further include displaying (e.g., on touchscreen display 260) the data representing the state of the location tracking device, as at 528 of FIG. 5B. An advantage of the receiver device performing the method 600 is that the receiver device may have greater processing capability and a higher battery level than the location tracking device. An advantage of displaying the data representing the state of the location tracking device is that it informs the user of the state of the location tracking device.

In an aspect, the data representing the state of the location tracking device may further include a battery level of the location tracking device, in which case, the method 600 may further include determining (e.g., by ping rate manager 255 or processor(s) 205) a ping rate for the location tracking device based on the battery level of the location tracking device and the data representing the state of the location tracking device, and sending (e.g., by wireless communications interface 230 as directed by ping rate manager 255 or processor(s) 205) the ping rate to the location tracking device, as at 534 of FIG. 5B. An advantage of updating the ping rate is that it can conserve the battery of the location tracking device, as described above. In an aspect, the ping rate may be further based on a distance between the receiver and the location tracking device, where the ping rate is lower for a longer distance between the wireless communications device and the location tracking device than for a shorter distance between the wireless communications device and the location tracking device.

In an aspect, where the method 600 is performed by a receiver device (e.g., user device 120) associated with the location tracking device, the method 600 may further include determining (e.g., by ping rate manager 255 or processor(s) 205) a route from a current location of the receiver to the predicted location of the location tracking device, as at 540 of FIG. 5B. The receiver may display (e.g., on touchscreen device 260) the route and a representation of a confidence score in the predicted location, as at 542 of FIG. 5B. An advantage of determining a route to the predicted location of the location tracking device is to enable the receiver to intercept the location tracking device at the predicted location, rather than the receiver being directed to a previous location of the location tracking device that the location tracking device may have vacated.

Although the foregoing has been described in terms of a location tracker, as will be appreciated, the disclosure is not so limited. Rather, any device that tracks its location, speed, and/or direction of travel can automatically adjust its ping rate as described herein, and/or can provide predictions of its, or another device's, future location.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for calculating a predicted future location of a location tracking device, comprising:
   detecting, by a wireless communications device, a breach of a geofence made by the location tracking device;
   receiving, at the wireless communications device, data representing a state of the location tracking device, the state of the location tracking device comprising at least a current location of the location tracking device and a velocity of the location tracking device;
   determining, by the wireless communications device, based on the data representing the state of the location tracking device, the predicted future location of the location tracking device; and
   updating, by the wireless communications device, a ping rate for the location tracking device, wherein the ping rate is based at least in part on a distance between the location tracking device and a receiver device associated with the location tracking device.

2. The method of claim 1, further comprising:
   calculating, by the wireless communications device, a confidence score in the predicted future location of the location tracking device.

3. The method of claim 1, further comprising receiving a message from the receiver device associated with the location tracking device to increase the ping rate for the location tracking device based on detection of the breach of the geofence.

4. The method of claim 1, wherein the data representing the state of the location tracking device further includes a battery level of the location tracking device, and
   wherein the wireless communications device updates the ping rate for the location tracking device based further on the battery level of the location tracking device and the data representing the state of the location tracking device.

5. The method of claim 1, further comprising:
   sending, by the wireless communications device, a notification of the detected breach to the receiver device associated with the location tracking device; and
   sending, by the wireless communications device, the predicted future location to the receiver device to enable the receiver device to intercept the location tracking device.

6. The method of claim 1, wherein the wireless communications device receives the data representing the state of the location tracking device from motion sensors of the location tracking device and wireless interface connections of the location tracking device.

7. The method of claim 6, wherein the wireless interface connections comprise one or more of a wireless local area network connection, a wide area network connection, or a satellite positioning system connection.

8. The method of claim 1, further comprising sending a message to the location tracking device to increase the ping rate for the location tracking device based on detection of the breach of the geofence.

9. The method of claim 1, wherein the wireless communications device detects the breach based on reception of a breach notification from the location tracking device.

10. The method of claim 1, wherein the wireless communications device receives the data representing the state of the location tracking device from the location tracking device.

11. The method of claim 10, further comprising:
displaying, on a user interface of the wireless communications device, the data representing the state of the location tracking device.

12. The method of claim 1, wherein the data representing the state of the location tracking device further includes a battery level of the location tracking device, the method further comprising:
determining, by the wireless communications device, the ping rate for the location tracking device based at least in part on the battery level of the location tracking device and the data representing the state of the location tracking device; and
sending, by the wireless communications device, the ping rate to the location tracking device.

13. The method of claim 12, wherein the ping rate is lower for a longer distance between the wireless communications device and the location tracking device than for a shorter distance between the wireless communications device and the location tracking device.

14. The method of claim 1, further comprising:
determining, by the wireless communications device, a route from a current location of the wireless communications device to the predicted future location of the location tracking device.

15. The method of claim 14, further comprising:
displaying, on a user interface of the wireless communications device, the route and a representation of a confidence score in the predicted future location.

16. An apparatus for calculating a predicted future location of a location tracking device, comprising:
at least one processor configured to:
detect a breach of a geofence made by the location tracking device;
receive data representing a state of the location tracking device, the state of the location tracking device comprising at least a current location of the location tracking device and a velocity of the location tracking device;
determine, based on the data representing the state of the location tracking device, the predicted future location of the location tracking device; and
update a ping rate for the location tracking device, wherein the ping rate is based at least in part on a distance between the location tracking device and a receiver device associated with the location tracking device.

17. The apparatus of claim 16, wherein the at least one processor is further configured to:
calculate a confidence score in the predicted future location of the location tracking device.

18. The apparatus of claim 16, further comprising a transceiver configured to receive a message from the receiver device associated with the location tracking device to increase the ping rate for the location tracking device based on detection of the breach of the geofence.

19. The apparatus of claim 16, wherein the data representing the state of the location tracking device further includes a battery level of the location tracking device, and
wherein the ping rate for the location tracking device is updated further based on the battery level of the location tracking device and the data representing the state of the location tracking device.

20. The apparatus of claim 16, wherein the at least one processor is further configured to:
cause a transceiver of the wireless communication device to send a notification of the detected breach to the receiver device associated with the location tracking device; and
cause the transceiver to send the predicted future location to the receiver device to enable the receiver device to intercept the location tracking device.

21. The apparatus of claim 16, further comprising a transceiver configured to transmit a message to the location tracking device to increase the ping rate for the location tracking device based on detection of the breach of the geofence.

22. The apparatus of claim 16, wherein the wireless communications device detects the breach based on reception of a breach notification from the location tracking device.

23. The apparatus of claim 16, wherein the wireless communications device receives the data representing the state of the location tracking device from the location tracking device.

24. The apparatus of claim 23, wherein the at least one processor is further configured to:
display, on a user interface of the wireless communications device, the data representing the state of the location tracking device.

25. The apparatus of claim 21, wherein the data representing the state of the location tracking device further includes a battery level of the location tracking device, and wherein the at least one processor is further configured to:
determine the ping rate for the location tracking device based on the battery level of the location tracking device and the data representing the state of the location tracking device; and
cause a transceiver of the wireless communications device to send the ping rate to the location tracking device.

26. The apparatus of claim 25, wherein the ping rate is lower for a longer distance between the wireless communications device and the location tracking device than for a shorter distance between the wireless communications device and the location tracking device.

27. The apparatus of claim 21, wherein the at least one processor is further configured to:
determine a route from a current location of the wireless communications device to the predicted future location of the location tracking device.

28. The apparatus of claim 27, wherein the at least one processor is further configured to:
display, on a user interface of the wireless communications device, the route and a representation of a confidence score in the predicted future location.

29. An apparatus for calculating a predicted future location of a location tracking device, comprising:
  means for processing configured to:
    detect a breach of a geofence made by the location tracking device;
    receive data representing a state of the location tracking device, the state of the location tracking device comprising at least a current location of the location tracking device and a velocity of the location tracking device;
    determine, based on the data representing the state of the location tracking device, the predicted future location of the location tracking device; and
    update a ping rate for the location tracking device, wherein the ping rate is based at least in part on a distance between the location tracking device and a receiver device associated with the location tracking device.

30. A non-transitory computer-readable medium storing computer-executable instructions for calculating a predicted future location of a location tracking device, the computer-executable instructions comprising:
  at least one instruction instructing a wireless communications device to detect a breach of a geofence made by the location tracking device;
  at least one instruction instructing the wireless communications device to receive data representing a state of the location tracking device, the state of the location tracking device comprising at least a current location of the location tracking device and a velocity of the location tracking device;
  at least one instruction instructing the wireless communications device to determine, based on the data representing the state of the location tracking device, the predicted future location of the location tracking device; and
  at least one instruction instructing the wireless communications device to update a ping rate for the location tracking device, wherein the ping rate is based at least in part on a distance between the location tracking device and a receiver device associated with the location tracking device.

* * * * *